United States Patent Office 2,744,133
Patented May 1, 1956

2,744,133

PROCESS FOR THE PRODUCTION OF LOW-BIURET CONTENT UREA

Charles Cramer, Vaduz, Liechtenstein, assignor to Inventa A. G. fuer Forschung und Patentverwertung, Zurich, Switzerland No Drawing. Application April 24, 1953,
Serial No. 358,955

2 Claims. (Cl. 260—555)

This invention relates to improvements in the production of urea from ammonia and carbon dioxide at elevated temperatures and pressures.

More particularly the invention relates to a new method for the treatment of the effluents of the urea autoclave so as to prevent, to a great extent, the formation of decomposition products such as biuret.

The present application is a continuation-in-part of my co-pending application Ser. No. 210,807, filed February 14, 1951, now abandoned.

It is a fact well known to those skilled in the art that urea contained in the aqueous solutions obtained in synthetic production of urea, decomposes at higher temperature under formation of biuret and ammonia. Synthetic urea always contains varying amounts of biuret, i. e. 1 to 2 per cent. In some of the industrial applications where urea is used in combination with other chemicals, for instance with formaldehyde in textile finishings, the biuret content is disturbing by causing turbidity on the treating solutions and, subsequently, destroying the brilliancy of the textile finish.

Therefore, the biuret content of technical urea has to be reduced by recrystallization before urea can be used for the above-mentioned type of application.

It is the object of the present invention to provide a process wherein urea with a sufficiently low content of biuret is directly prepared in the technical synthesis.

For better understanding of the invention, a brief description of the methods hitherto used and the difficulties encountered are given hereinbelow.

The molten product issuing from the reaction chamber of the urea synthesis contains urea, water, ammonium carbamate, dissolved and undissolved gases. Pressure is usually reduced on the product from the reaction pressure to a pressure slightly above atmospheric, whereby the carbamate which has not been transformed into urea and water, decomposes more or less quickly, according to temperature and pressure conditions, into gaseous carbondioxide and ammonia.

Fréjacques (Chimie et Industrie, vol. 60, page 29 (1948)) has found that decomposition of urea in solution is practically nil up to 60° C., but becomes notable in the neighborhood of 100° C. and is rapid above 125 to 130° C.

As has been shown by Fréjacques (Bull. Soc. Chim. France, vol. 31, page 307–316 (1952)), the decomposition of carbamate into gaseous ammonia and carbondioxide is strongly endothermic and consumes about 39 calories per mole. Therefore, heat has to be applied, but at the same time care must be taken not to overheat the reaction mixture in order to prevent excessive formation of biuret by decomposition of urea to take place.

In order to maintain this side-reaction within tolerable limits, it has been tried to keep the temperature as low as possible during the carbamate decomposition. This, however, lengthened the time required to decompose the carbamate, so that it became necessary to employ large vessels.

Subsequently, it was attempted to shorten the process by stirring the solution from which ammonia and carbon dioxide are separating. Thus, for instance, as indicated in the pertinent literature, the effluents of the urea autoclave were expanded into a first vessel equipped with stirrers and a heating device, whereby pressure was reduced from reaction pressure, i. e. 200 atmospheres gauge, down to atmospheric or slightly above atmospheric pressure. Simultaneously, a part of the carbamate present in the effluents was decomposed and heat was applied so that the temperature was maintained at 65° C.

The aqueous solution of urea still containing some undecomposed ammonium carbamate was then passed into a second vessel equipped with heated trays and stirrers. By flowing down from one tray to the other, the solution was heated up above 72° C. and vigorously stirred, whereby the decomposition of the residual part of ammonium carbamate took place.

Although the use of a large vessel could be avoided with these types of arrangement and little or no biuret was formed in the first vessel, decomposition of urea with formation of biuret took place while the solution in the second vessel was heated up in order to free it from the residual ammonium carbamate.

Apparently the two reactions, decomposition of ammonium carbamate, on the one hand, and formation of biuret on the other hand, are favored by conditions opposing each other. The decomposition of ammonium carbamate should be fast and complete; the formation of biuret should be avoided as much as possible. The speed of decomposition of ammonium carbamate at a given temperature is high at the beginning, falls rapidly off when about half of the carbamate is decomposed, and becomes very slow when only traces are left in the solution; the rate of speed is generally increased when higher temperatures are applied at a given pressure.

The speed of formation of biuret from urea in aqueous solution at a given temperature is low at the beginning, but once the reaction has started, the speed increases remarkably. Whereas the speed is not very much affected by the conditions of pressure, temperature is of major importance as has been described before. Furthermore, there have been indications by several authors (Fréjacques, Fawsitt and others, Zts. Phys. Chimie, vol. 41, page 601–629 (1902)), that presence of ammonia slows down the decomposition reaction of urea. This means that danger of formation of biuret becomes strongest when the decomposition of ammonium carbamate is about completed and the solution is practically free of ammonia.

I have found that the pressure reduction, carbamate decomposition and separation can be carried out considerably faster and more simply, and therefore also with reduced formation of biuret, when the operation is performed in two steps in such a manner that in the first stage by far the greater part of the carbamate is decomposed through intensive heating at higher temperature, during a short time of reaction, and that in the second stage, only the carbamate residues are decomposed at lower temperature and longer reaction time. Although the high temperature in the first stage is favorable to the formation of biuret, one obtains, by using an extremely short reaction period, urea which contains only 0.2–0.4 per cent of biuret. The second stage being carried out at sufficiently low temperatures, no additional biuret is formed in spite of the prolonged time of stay. The expansion energy is utilized in the first step to shorten the reaction period by passing the reaction melt through a heater constructed so as to achieve a high rate of flow.

It has been found that a heater comprising a bundle of straight tubes with small cross-sectional area is suitable for this first decomposition stage.

In this manner good mixing, uniform wetting of the surface, high speed, and thus high heat transfer and short time of reaction are achieved and a special agitating device becomes unnecessary.

An example of the preferred mode of operation is given hereinbelow.

The effluents of the urea autoclave containing 31.5% urea, 46.4% ammonium carbamate, 11.4% ammonia, 10.2% water and 0.7% inert gases (mostly nitrogen), are expanded continuously through a relief valve into the decomposition vessel at a rate of 11 kg. of mixture per minute, so that the rate of flow is in excess of 50 m. per second. The vessel is heated with steam of 20 atmospheres gauge and the temperature of the mixture leaving the decomposition vessel is maintained at 136° C. A pressure gauge mounted in the top cover of the decomposition vessel indicates a pressure of 6.2 atmospheres. From these data a reaction time of $\frac{1}{20}$ of a second is calculated. Analysis of the products at the exit of the vessel shows 31.5% urea, 4.2% ammonium carbamate, 29.5% ammonia, 24.0% carbon dioxide, 10.0% water and 0.7% inert gases. This indicates that 90.7% of the carbamate arriving from the autoclave have been decomposed while passing through the decomposition vessel.

The products subsequently enter a conventional separating vessel equipped with a steam jacket and heating device at the bottom. The gaseous products separating from the liquid are leaving at the top and the urea solution is collected at the bottom of the vessel. Heat is applied by steam of 1.5 atmospheres gauge so that the temperature of the urea solution does not exceed 70° C. The pressure gauge mounted in the top of the separator reads 785 mm. mercury. The bottom liquid is allowed to stay 6 minutes at the temperature of 70° C. before it is drawn off through an overflow for further processing. Analysis shows it to contain:

| | Per cent |
|---|---|
| Urea | 79.6 |
| Ammonium carbamate | 0.2 |
| Ammonia | 0.6 |
| Water | 19.6 |

This indicates that essentially all the ammonium carbamate has been decomposed.

Separate samples of the mixture are taken of:
(a) Urea autoclave effluent before entering the decomposition vessel,
(b) Mixture after leaving the decomposition vessel,
(c) Urea solution drawn from the bottom overflow of the separator.

All three samples are analysed carefully for their biuret content:

| Sample | a | b | c |
|---|---|---|---|
| Biuret, percent | 0.063 | 0.063 | 0.175 |
| Biuret, percent calculated on dry urea | 0.200 | 0.200 | 0.220 |

From these figures it will be seen that the amount of biuret formed during the decomposition of ammonium carbamate is very low as compared to the percentage found in the conventional methods hitherto in use.

While I have described above an example of the preferred mode of operation, it should be understood that this example is only an illustration and that the procedure is not limited to the particulars mentioned, but that variations of the figure and operation conditions may be varied without departing from the spirit of the invention.

What I claim is:

1. In the production of low-biuret content urea by synthesis from $CO_2$ and $NH_3$ and decomposition of unconverted primarily formed ammoniumcarbamate, the steps which comprise carrying out said decomposition in two separate stages by first passing an aqueous solution containing said ammoniumcarbamate through a reaction chamber at higher temperature of about 140° C. for a very short time of a fraction of one second, thereby effecting the decomposition of about 90% of ammoniumcarbamate present in the solution, with formation of only 0.2–0.4% of biuret, separating the gaseous and liquid reaction product, and thereafter maintaining the remaining approximately 10% of carbamate contained in the liquid phase at lower temperature of about 78° C. for a period of several minutes, thus obtaining a urea with said low biuret content.

2. A process according to claim 1, wherein the speedy decomposition of the carbamate in the first stage is performed by passing the solution through a heat exchanger at high flow-through speed, thereby utilizing the decomposition energy generated in the reaction.

References Cited in the file of this patent
UNITED STATES PATENTS

| 1,429,483 | Bosch et al. | Sept. 19, 1922 |
| 2,267,133 | Porter | Dec. 23, 1941 |

FOREIGN PATENTS

| 1,055,995 | France | Oct. 21, 1953 |